United States Patent [19]

Clough

[11] Patent Number: 5,358,699
[45] Date of Patent: Oct. 25, 1994

[54] PRECIOUS METAL RECOVERY PROCESS FROM CARBONACEOUS ORES

[75] Inventor: Thomas J. Clough, Santa Monica, Calif.

[73] Assignee: Ensci, Inc., Pismo Beach, Calif.

[21] Appl. No.: 980,676

[22] Filed: Nov. 24, 1992

Related U.S. Application Data

[63] Continuation-in-part of Ser. No. 936,237, Aug. 26, 1992, which is a continuation-in-part of Ser. No. 751,793, Aug. 29, 1991, which is a continuation-in-part of Ser. No. 627,896, Dec. 13, 1990, abandoned, which is a continuation of Ser. No. 213,884, Jun. 30, 1988, abandoned, which is a continuation-in-part of Ser. No. 5,130, Jan. 20, 1987, Pat. No. 4,765,827, and Ser. No. 25,069, Mar. 12, 1987, Pat. No. 4,801,329.

[51] Int. Cl.$^5$ .................. C22B 11/04; C22B 11/00
[52] U.S. Cl. .................. 423/22; 423/23; 423/27; 423/29; 423/30; 75/729; 75/732; 75/735; 75/737; 75/741; 75/744
[58] Field of Search .............. 423/22, 23, 27, 29, 423/30; 75/729, 732, 735, 737, 741, 744

[56] References Cited

U.S. PATENT DOCUMENTS

| | | | |
|---|---|---|---|
| 3,574,600 | 4/1971 | Scheiner et al. | 423/27 |
| 3,639,925 | 2/1972 | Scheiner et al. | 423/29 |
| 3,642,464 | 2/1972 | Dorenfeld et al. | 423/89 |
| 4,038,362 | 7/1977 | Guay | 423/89 |
| 4,289,532 | 9/1981 | Matson et al. | 423/29 |
| 4,571,263 | 2/1986 | Weir et al. | 423/27 |
| 4,645,535 | 2/1987 | Little | 423/22 |
| 4,731,113 | 3/1988 | Little | 423/27 |
| 4,765,834 | 8/1988 | Ananthapadmanabhan | 423/24 |
| 4,902,345 | 2/1990 | Ball et al. | 423/27 |
| 5,131,943 | 7/1992 | Allison et al. | 75/426 |
| 5,198,021 | 3/1993 | Virnig | 423/22 |

*Primary Examiner*—Herbert J. Lilling
*Attorney, Agent, or Firm*—Frank J. Uxa, Jr.

[57] ABSTRACT

A process for recovering at least one precious metal from an ore containing carbonaceous material is disclosed. The process involves the use of certain plant derived ortho-quinone containing components, in particular, certain lignin and/or tannin derived components containing ortho-quinone functionality.

Preferred compositions comprise at least one ligno sulfonate component containing ortho-quinone functionality. In the process, the use of at least one additional oxidant capable of maintaining the ortho-quinone containing functionality in the desired oxidation state provides for integrated process synergy.

19 Claims, No Drawings

PRECIOUS METAL RECOVERY PROCESS FROM CARBONACEOUS ORES

RELATED APPLICATIONS

This application is a continuation in part of copending application Ser. No. 936,237 filed Aug. 26, 1992, which is a continuation-in-part of co-pending application Ser. No. 751,793 filed Aug. 29, 1991, which is a continuation-in-part of co-pending application Ser. No. 627,896 filed Dec. 13, 1990 now abandoned which application is a continuation of application Ser. No. 213,884 filed Jun. 30, 1988 now abandoned which application is a continuation-in-part of application Ser. No. 005,130 filed Jan. 20, 1987, now U.S. Pat. No. 4,765,827 and application Ser. No. 025,069, filed Mar. 12, 1987, now U.S. Pat. No. 4,801,329. Each of these applications and patents are hereby incorporated in their entirety herein by reference.

BACKGROUND OF THE INVENTION

This invention relates to a process for recovering at least one metal, e.g., gold, silver, the platinum group metals and the like, from an ore containing carbonaceous material and the metal to be recovered. In particular, the invention relates to a process which involves processing a metal-containing ore so as to facilitate the recovery of the metal from the ore.

Carbonaceous ores, i.e., ores which contain elemental carbon (e.g., graphite) and/or organic compounds, often contain valuable metals, such as gold, silver, the platinum group metals and the like. One characteristic of such ores which has made them difficult and expensive to process is that the presence of carbon and organic compounds inhibits metal recovery using conventional, e.g., cyanide, processing. In other words, the presence of organic material in such carbonaceous ores tends to interfere with metal extraction, e.g., by cyanidation. For example, a substantial amount of carbonaceous ore is not amenable to conventional cyanidation techniques because of the presence of carbon (which often acts like activated carbon), and relatively long chained organic hydrocarbon-type compounds containing sulfur, nitrogen, carboxylic acid groups and the like.

There is a growing world-wide interest in metal recovery from carbonaceous ores. Thus, in spite of the substantial work which has been done to provide for such metal recovery, a need currently exists to provide for a process for metal recovery from carbonaceous ores.

SUMMARY OF THE INVENTION

A process for recovering at least one metal from an ore containing the metal and at least one of certain carbonaceous material has been discovered.

In one broad aspect, the present process involves contacting at least one ore containing at least one metal to be recovered and carbonaceous material with at least one added plant derived aromatic component having ortho quinone functionality in an amount effective to at least promote the oxidation of the carbonaceous material. The contacting occurs at conditions effective to (1) chemically oxidize at least a portion of the carbonaceous material, and (2) at least partially liberate the metal to be recovered from the ore. By liberation is meant that the gold is more susceptible to recovery, for example by cyanidation, than without pretreatment. The first metal is then recovered from the ore.

In one embodiment, the contacting occurs in the presence of an additional oxidant, more preferably a gaseous source of oxygen, e.g., air, enriched/diluted air, oxygen and the like.

In one embodiment, the plant derived aromatic containing component having ortho quinone functionality is preferably selected from a component which has one or more water solubilizing groups attached to the component more preferably as a water soluble salt such as an alkali metal salt. The plant derived aromatic containing component having ortho-quinone functionality, hereinafter referred to as ortho-quinone component, and mixtures thereof is present in an amount effective to at least promote the oxidation of the carbonaceous material. The ore or ores preferably contain precious metals, such as gold, silver, the platinum group metals and the like, which can be recovered using the process of this invention. The various embodiments of this invention can be practiced singly or in any combination of embodiments, with selection and optimization generally being a function of the ore type and desired metal value recovered.

The benefits resulting from the process of this invention, e.g., improved rate of oxidation including solubilization and/or conversion to a different form, i.e., solids, such as insoluble jarrosite, sulfates, arsenates and the like, improved rate of oxidation of the carbonaceous material and/or yield/recovery of desired metal as a function of time, are substantial. Without wishing to limit the invention to any specific theory of operation, it is believed that many of such benefits result from the direct and/or indirect oxidation, i.e., oxidation promoting effect of one or more of the above o-quinone containing components in the process of this invention on the carbonaceous portion of the ore. It is believed that the effect of the ortho-quinone containing component is an oxidation effect which reduces the affinity of the carbonaceous material for gold complexes, particularly gold cyanide complexes, which affinity (referred to in the art as preg robbing) reduces and/or substantially reduces the recovery of gold from such ores. It is believed that the o-quinone containing components can interact directly and/or indirectly with the carbonaceous material by direct oxidation of the carbonaceous material and/or by the generation of an active oxidant specie which interacts with the carbonaceous material to reduce its preg robbing characteristics.

Another embodiment of this invention is the obtaining of such benefits through a catalytic effect by the ortho-quinone containing components. Without wishing to limit the invention to any specific of operation, it is believed that the ortho-quinone containing component during its oxidation interaction with the carbonaceous material is reduced and is subsequently regenerated by an additional oxidant such as an active oxygen specie, such as oxygen. During a given period of time in which the ore is contacted with the ortho-quinone containing component and an additional oxidant, the ortho-quinone containing component can cycle between an oxidized and reduced state, i.e., the component is regenerated, thereby allowing the oxidation of the carbonaceous material to be carried out with an amount of ortho-quinone containing component less than would be required without the regeneration of such component. The use of such lesser amounts of the ortho-quinone containing component, i.e., a catalytic amount, allows for improved process efficiencies.

The promoting effect of the presently useful ortho-quinone redox couples allows the process to be effective, e.g., from the standpoint of improved recovery of desired metal as a function of time, on a wide variety of difficult to process ores.

Improved yields or recoveries of metal are often achieved under less severe conditions by practicing the present process, especially when compared to recovering metal from the carbonaceous ore without utilizing the process of this invention. The present process is relatively easy to operate and control. Relatively low concentrations of the o-quinone containing components are used and relatively mild operating conditions may be employed. With regard to carbonaceous ores, operating and capital costs are often reduced relative to previous chlorination/oxidation procedures which require substantial amounts of chemicals and/or expensive metallurgy to combat corrosion problems. Thus, the present invention can provide a cost effective approach to metal recovery from carbonaceous ores.

DETAILED DESCRIPTION OF THE INVENTION

The present process provides substantial advantages. For example, the use of at least one of certain promoting o-quinone containing components, particularly lignin and tannin derived components particularly having water solubilizing groups such as the sodium salt and more particularly in a redox cycling catalytic amount in the presence of an additional oxidant provides for improved contacting, e.g., to increase the rate of carbonaceous material oxidation and ultimately to improve the yield of metal or metals recovered. The improved rate of carbonaceous material oxidation also results in significant process and cost economies. In addition, effective metal recoveries can be achieved utilizing low grade (heretofore difficult to process) carbonaceous ores. Further, the present process does not require the addition of sulfur dioxide or hydrogen sulfide to maintain or culture any bacteria.

The process of the present invention is useful for metal recovery from carbonaceous ores, as defined herein. A large number of ore bodies and large amounts of carbonaceous ores are susceptible to be treated in accordance with the present process. Examples of such ores include: oxidized and carbonaceous ores from various locations in north central and northeastern Nevada, such as the Carlin ore, the Cortez ore and the Witwatersrand ore; ores from the Prestea and Ashanti gold fields in Ghana; the Natalkinsk and Bakyrichik ores from the Soviet Union; various Canadian ores such as the gold ore from the Mcintyre Mine, located near Schamacher, Ontario; and the like ores. The carbonaceous ores may include oxidized ore material, possibly even a major amount of oxidized ore material. Also, the carbonaceous ores may contain metal pyrites. The carbonaceous ore which contains metal pyrites may be processed for pyrite removal by physical and/or chemical means to reduce the pyrite content of the ore prior to the contacting step of the present invention or be processed along with the carbonaceous portion of the ore. For example, subjecting the ore to various procedures such as grinding, particle size fractionation, flotation and the like can reduce the amount of metal pyrites in the ore.

The present process employs at least one of certain o-quinone containing components. Such components may include alkali and/or alkaline earth metals and/or ammonium salts provided that they also contain o-quinone containing functionality which is effective in the present invention. Such o-quinone containing components are present during the contacting step in an amount effective to at least promote the oxidation of the carbonaceous material in the ore, Thus, such ortho quinone containing components are present in an amount effective to promote such oxidation and/or to oxidize the carbonaceous material in the ore.

The presently useful plant derived aromatic components having o-quinone functionality are preferably selected from the group consisting of one or more lignin derived components, one or more tannin derived components and mixtures thereof. The lignin and tannin derived components may be selected from natural materials or lignin and tannin containing materials from various lignin and tannin manufacturing processes. As set forth above, preferred components having ortho-quinone functionality are those that also have water solubilizing functionality particularly as a water solubilizing salt particularly at alkaline pH.

Lignin in higher plants is formed by complex enzymatic processes which produce substituted phenolic compounds. Lignins are a family of three-dimensional polymers which bind together the cellulose fibers in higher plants. Lignins can provide rigidity to the plant structure and, being in general resistant to chemical and biological attack, helps plants from decay. Lignin is distributed widely throughout the plant kingdom. Plant lignins are generally divided into three broad classes which are commonly called softwood, hardwood and grass or annual plant lignins. The latter also includes such plants as bamboo and palm. Thus lignin can be released by chemical or mechanical disintegration from a wide variety of plant tissues including, as set forth above, softwood (coniferous), hardwood (deciduous) or from bark, cambium, sapwood or heartwood. In addition, lignin can be released from jute, rice hulls, peanut shells, barley straw, begasse, coconut shells, alfalfa, pine needles, oat and wheat straw, corn cobs and various other plant materials.

Although the exact structure of lignin is unknown, plant lignins from certain trees are considered to be a polymeric material almost entirely made up of phenylpropane units that exist as branched chains of cross-linked structures. In lignin from softwood trees, nearly all the aromatic rings have one methoxyl group in position three from the propyl side chain.

The phenolic precursors of hardwood lignin trees contain methoxyl groups in one or both of the positions adjacent to the phenolic hydroxyl; however, in softwoods the precursors are generally substituted at only one position and occasionally not at all. As a result of this softwood lignin contains about twice as many reactive sites on the aromatic rings and contain a higher proportion of carbon—carbon linkages between aromatic rings. A chemical structure which incorporates various chemical groupings found in, for example, spruce native lignin in their existing ratios shows various joined coniferyl units with approximately one-third of the units still having a free phenolic group and most having an aliphatic alcohol group in the side chain. A majority of the phenolic groups are generally in etherified form, i.e., a phenolic polyether, and have a number average molecular weight of generally about 2000 to about 10,000.

There are two major pulping processes which promote lignin solubility, each using a different approach. In sulfite processes, the lignin molecule is attacked by sulfonate anions generally in the presence of sodium, ammonium, magnesium or calcium cations and at varying pH values to produce a range of pulps with varying lignin and hemicellulose contents. The lignin molecule in this process becomes sulfonated and thus water soluble. Alternatively, in alkaline processes, the lignin molecule is depolymerized by alkaline hydrolysis of the ether bonds between the aromatic units.

Lignosulfonate products are generally produced from wood by the acid bisulfite pulping process and the kraft process. In the acid sulfite pulping process, the lignin in, for example, wood chips is subjected to reaction with an aqueous bisulfite salt at elevated temperature and pressure. During the process, the lignin is rendered water-soluble by a combination of depolymerization and sulfonation. Both cleavage and sulfonation occur almost entirely at positions immediately adjacent to the aromatic rings. Cleavage of this carbon-oxygen bond destroys one of the linkages common to both hardwood and softwood lignin.

The resulting lignin sulfonate is dissolved in the spent sulfite pulping liquor along with a variety of carbohydrate compounds which are primarily formed by degradation of the hemicellulose components of wood. The chemical composition of hemicellulose varies considerably with species of tree, even within the general categories of hardwoods and softwoods. The degradation products, therefore, also vary widely and can include glucose, mannose, galactose, xylose, arabinose and rhamnose in proportions which are determined largely by the wood source. These sugars usually account for 20-25% of the total spent sulfite liquor solids. In addition, ash can be present in the liquor solids.

In sulfite pulping, generally up to about one-half of the coniferyl building units of the lignin molecule add sulfonate groups with varying ease. The locations of the attacks are generally the highly active benzyl alcohol or benzyl ether groups of the lignin. These oxygen containing groupings on the carbon adjacent to the aromatic ring are very labile and are substituted in the pulping process by the highly polar sulfonate groups. If the benzyl alcohol or ether is attached to a free phenolic unit, a sulfonate group is more readily introduced than when the benzyl group is attached to a phenol ether. Sulfonation apparently also occurs on side chain carbons adjacent to carbonyl groups. Thus, through addition of solvating groups to the high polymer lignin and through low order acid hydrolysis and splitting of the lignin molecule, solution of the lignin is achieved.

Lignosulfonates are generally classified as polydisperse macromolecular polymers with molecular weights ranging from several hundred to more than one hundred thousand. The phenylpropane structural units of lignosulfonates can be linked together in many different patterns by carbon-carbon and ether linkages. Most of the sulfonate groups in lignosulfonates are thought to be joined to the alpha carbons of the side chain, with about one sulfonate radical for two phenylpropane units. Primary hydroxyl groups are found on many of the phenylpropane units while others have various carbonyl groups.

Lignosulfonates from the sulfite process can generally have a weight average molecular weight up to about 100,000. The calcium lignosulfonate can be used as starting materials for other products due to the ease with which the calcium cation may be replaced with other cations to form the appropriate soluble sulfate salts, such as sodium, ammonium and potassium.

The other basic process to solubilize lignin is the alkaline pulping processes. The most predominate lignin interlinkage is the beta ether type, and this is cleaved by alkali to form smaller molecular size phenols which tend to dissolve in water as the sodium phenolate salts. In phenyl coumarin type interlinkages, alkali attack frees the phenolic group for solubilizing salt formation, but concurrent formaldehyde loss from the side chain can produce a double bond between the two benzene rings to form phenolic stilbene portions in the alkali lignin.

In the kraft process, pulping liquor which contains from about 20 to about 30 wt % sodium sulfide in a mixture with sodium hydroxide is used. Whereas, sodium hydroxide alone will depolymerize the lignin to soluble form, the hydroxide can also split the ether groups of the wood carbohydrates causing their undesired dissolution. A sodium hydroxide-sodium sulfite mixture is generally more effective in achieving continued lignin dissolution while having comparable effects on the carbohydrate dissolution. Apparently, sulfide not only promotes more rapid splitting of the lignin ether groups, but introduction of sulfur in the benzyl alcohol position may inhibit concurrent polymerizing reactions.

The location of the alkaline attack on the native lignin generally results in the ether groups being split to form smaller molecular size free phenols. Typically about 5 to 10% of the lignin can be decomposed all the way down to monomeric phenols in the liquor, while the remainder is solubilized as higher molecular weight portions of the gross lignin molecule. The potential ether split and loss of formaldehyde can produce stilbene type structures. Comparable dehydration and formaldehyde loss can produce unsaturated ethers. In addition, carboxyl groups are also found in kraft lignin.

In alkaline hydrolysis, the phenolic group in the lignin molecule are generally doubled so that they are present on a majority of the units.

By proper two-stage acidification, coagulation and purification, there can be obtained a reproducible kraft lignin from pine black liquor with a structure and number average molecular weight approximately about 2000 to about 12,000 and a weight average molecular weight of about 2500 to about 10,000. Based upon the mode of alkaline attack, a generalized structure can be designated as a plurality of aromatic units as polyelectrolyte with phenolic groups, carboxyl groups, keto groups, aliphatic hydroxyl, and double bonds.

The processed lignin can be further processed to modify various properties of the lignin such as solubility in an aqueous medium, for example, by substituent group modifications such as sulfonic, hydroxyl, polyhydroxyl and further reactions with polyhydroxy aromatic compounds, particularly catechol containing compounds. Such modifications, including examples as set forth above, are included within the scope of this invention.

Lignin derived products can undergo physical and chemical modification by modification of sulfite liquor, sulfonated lignin, and kraft lignin. Depending on the optimum properties required, lignin derived products, including lignosulfonates, can be processed by one or more methods including conversion to other salts, polymerization, classification of molecular weights, and oxidation-reduction of macromolecules. The solubility, absorption, electrolytic, and complexing characteristics of such products can be modified based upon their molecular structure shape and size, i.e., the type, quantity and location of functional groups including sulfonic, sulfonate, sodium sulfonate, hydroxyl, poly hydroxy including di hydroxy benzene such as catechol, carbonyl, methoxy, carboxyl and chloride.

As set forth above, the preferred lignin derived products having ortho-quinone functionality are those having water solubilizing groups, particularly sulfonate, carboxylate, phenolate groups and the like which enhance the solubility characteristics of such components particularly at alkaline pH. In addition, it is preferred to optimize the amount of ortho-quinone functionality in the lignin containing component, preferably during processing such as during the sulfite or kraft pulping process. During such processing, catechol functionality is believed to be introduced by demethylation during the depolymerization and/or hydrolysis and other reactions of the lignin raw material. The formation of catechol functionality is believed to be enhanced by both temperature and alkaline pH particularly at increased process severities. As set forth above, the lignin containing component can be further reacted to enhance the formation of catechol functionality. The catechol functionality can be converted to the ortho-quinone functionality using, for example, an active oxygen species, such as oxygen. As used herein, the term plant derived aromatic containing components includes both components having ortho-quinone functionality and/or catechol functionality which can be converted to ortho quinone functionality, preferably under the in situ and external regeneration process conditions of this invention. In addition, various substituent groups can be introduced onto the 1,2 dihydroxy benzene functionality group in order to modify the oxidation potential and regeneration of the reduced ortho-quinone functionality for overall effectiveness in the treatment of the carbonaceous ore. In general, substituents on the quinone nucleus such as halogens particularly chloride, CN, $So_3Na$ in general raise the potential of the ortho-quinone functionality, whereas alkyl, i.e., methyl, methoxy, hydroxy, and various amine and alkyl substituted amine groups in general decrease the oxidation potential. As set forth above, the optimum oxidation potential and the oxidizing power of the ortho-quinone component is a function of the carbonaceous portion of the carbonaceous ore, the process conditions particularly the pH, and the regeneration of the ortho-quinone component, whether such regeneration be in situ such as when the ortho-quinone component is utilized in catalytic amounts or when larger amounts of the ortho-quinone component are utilized. The ortho-quinone component can be regenerated, for example, externally and recycled to the process. In general, it is preferred to have an oxidation potential of the ortho-quinone functionality which allows for reasonable process efficiencies, i.e., oxidation of the carbonaceous portion of the ore, so as to improve overall precious metal liberation and to provide ease of regeneration for the continued oxidation of the carbonaceous portion of the ore in situ and/or external regeneration.

Typical examples of lignin derived products which are suitable to provide the o-quinone oxidants of this invention are, for example, the treated or untreated spent liquors (i.e., containing the desired effluent lignin product solids)obtained from wood or other plant conversion, for example, the waste pulp liquor, or modified lignin products, such as by pyrolysis, reduction modification or ozonation of the aforementioned lignin individual products including spent liquors. The alkaline oxidized, hydrolyzed, partially desulfonated and subsequently resulfonated lignosulfonates are also suitable.

Certain of these lignin containing components are obtained in waste pulping liquors derived from softwood and hardwood starting materials. Lignin containing components may be additionally sulfonated or sulfomethylated.

Other lignin containing products are the ozonated lignosulfonates obtained from ozonation of the aforementioned ligno products, including treated or untreated spent liquors. In addition, purified lignin containing products from which the sugars and other saccharide constituents have been partially or totally removed such as by fermentation or, additionally, inorganic constituents have also been partially or totally removed are also useful.

As a further alternative, the lignin containing components may be one of the desulfonated lignosulfonates (including substantially pure lignosulfonate compositions) which are generally obtained by catalytic—frequently alkaline—oxidation processes conducted under conditions of high temperature and pressure, oftentimes with accompanying hydrolysis.

As set forth above, further modification of the lignin derived products are included within the scope of this invention and include the reaction of the foregoing lignin containing product materials with, for example, a halide, a halocarboxlyic acid or a sulfonating agent. In addition, further reactions can include one or more combinations of alkoxylation, sulfation, alkoxysulfation, alkylation or sulfomethylation. Any suitable sulfonation reagents may be used for sulfonation reaction. When straight sulfonation is desired, it is advantageously accomplished with an alkali metal (such as sodium) sulfite or sulfur dioxide. Sulfoalkylation can be accomplished with mixtures of an appropriate lower alkyl aldehyde and a bisulfite.

Other lignin containing compounds which may be used in the practice of this invention are the derivatives of an oxidized, partially desulfonated lignosulfonate obtained in the spent oxidized liquor from a dilute vanillin oxidized softwood or hardwood, spent sulfite liquor by acidification prior to vanillin extraction with an organic solvent and which can be further treated with, for example, sodium bisulfite and an aldehyde, preferably formaldehyde, at elevated temperature to sulfoalkylate, and/or sulfomethlate, the desulfonated lignosulfonate molecules.

Tannins occur in many plants and are in general separated by extraction. A typical example of tannin compound includes tree bark extract such as quebracho, hemlock and redwood extracts. The tannins are aromatic and are obtained from various plants and trees. Particularly preferred tannins are the condensed tannins which have catechol functionality, i.e., the catechol tannins which can generate and/or be converted to ortho-quinone functionality.

As set forth above, the activity (regeneration)of the o-quinone containing component can be affected by the pH of the aqueous composition employed in the present contacting step. Some activity of the o-quinone component may have to be sacrificed because of the pH of the aqueous composition during the contacting, which pH may be preferred for various other processing reasons. The particular pH employed can also affect the salt form of the o-quinone containing component employed, and such salts are o-quinone containing components within the scope of this invention.

As set forth above, the ortho-quinone containing components are effective in a catalytic and/or promoting amount, particularly in the presence of an additional active oxidant species such as oxygen, and such combination of component plus additional oxidant allows the ortho-quinone containing component to cycle between an ortho-quinone functionality and a reduced catechol functionality. Thus, the ortho-quinone containing component can interact with the carbonaceous portion of the ore followed by regeneration, i.e., reoxidation of the catechol functionality. After regeneration, the ortho-quinone functionality can further interact with the carbonaceous portion of the ore. Thus the ability to rapidly cycle between the ortho-quinone and catechol states produces a cycling component which can oxidize and be regenerated, thereby producing a series of oxidations/regenerations during contacting of the ore. As set forth above, the ortho-quinone containing component can be modified such as through substituent groups on the aromatic ring to optimize activity for both oxidation and regeneration, i.e., effective oxidation of the carbonaceous ore with effective regeneration, preferably rapid regeneration. The optimization provides for overall improved process effectiveness. Thus substituent groups such as methoxy, sulfonate, hydroxy, chloride and cyanide can be used to modify and enhance the overall oxidation regeneration effectiveness of the ortho-quinone containing components. Thus, it is preferred that the ortho-quinone containing component cycle rapidly and produce a number of cycles, for example at least about 4 cycles and generally from about 5 cycles up to about 1000 cycles or more or up to about 100 cycles, the number of cycles in general being such number which effectively allows for an improvement in metal recovery from the carbonaceous ore. The number of cycles in general will be a function of the carbonaceous content of the ore, its preg robbing characteristics, the concentration of the ortho-quinone containing component, as well as other impurities and components in the ore which may be susceptible to oxidation. By the term "cycle" is meant a single oxidation regeneration cycle, commonly referred to in promoter catalyst terms as "one turnover."

The specific amount of the o-quinone containing component employed may vary over a wide range and depends, for example, on the carbonaceous ore and/or the o-quinone containing component employed, and on the degree of oxidation desired. The weight percent of o-quinone functionality, based upon the molecular weight of the ortho-quinone component, can vary over a wide range and in general represents a weight percent of from at least about 1 weight percent to about 40 weight percent of the weight of the ortho-quinone containing component, i.e., for those compounds containing ortho-quinone functionality, more preferably from at least about 2 to about 30 weight percent and still more preferably from at least about 5 weight percent to about 25 weight percent. By ortho-quinone functionality is meant an ortho-quinone functionality having a molecular weight of about 108 and the relationship of that molecular weight from a weight percent standpoint to the total molecular weight of the compound. For example, for certain components the total molecular weight can be represented by the total molecular weight of the phenyl propane units, including substituents or such phenyl propane units. Since the ortho-quinone containing components in general will be mixtures, the above preferred ranges apply to the individual ortho-quinone containing components within the mixture.

Preferred molecular weight ranges are from about 1500 to about 75,000, more preferably from about 2000 to about 10,000 and still more preferably from about 2000 to about 6000.

In certain embodiments, preferred concentrations of the ortho-quinone containing component are in the range of about 0.05 to about 3%, more preferably from about 0.1 to about 2% by weight based upon the aqueous composition employed in the contacting, calculated as o-quinone containing component. It is generally convenient to provide the o-quinone containing compound in combination with, preferably in solution in, the aqueous composition used in the contacting step. As set forth above, it is preferred that the ortho-quinone containing component be present in an effective catalytic and/or promoting amount, particularly within the ranges set forth above. In addition, as set forth above, it is preferred that the ortho-quinone containing component be water soluble at the concentration and conditions at which it is effective for carrying out the process of this invention.

The o-quinone containing component can be added to the contacting step and/or can be formed in situ prior to or in the course of the contacting.

The present contacting preferably takes place in the presence of an aqueous liquid medium or composition. The ortho-quinone containing component, which is preferably soluble in the aqueous medium, may be added to the aqueous medium prior to the contacting. Any suitable, aqueous medium can be employed in the present process, including salt solutions, preferably sodium chloride. The pH of the aqueous medium may vary and in general a neutral or basic medium, preferably a basic or alkaline medium can be employed depending, for example, on the composition of the ore or ores being treated, the specific ortho-quinone containing component being employed, and the presence or absence of other components or entities such as soluble metals during the contacting. Preferably, the pH of the aqueous composition is in the range of about 7 to about 13, preferably from about 9 to about 13 and, still more preferably, from about 10 to about 12. The pH of the aqueous medium may be adjusted or maintained, e.g., during the contacting step, for example, by adding acid and/or base.

The aqueous medium comprises water, preferably a major amount of water. The medium is preferably substantially free of ions and other entities which have a substantial detrimental effect on the present process. Any suitable acid and/or base or combination of acids and/or bases may be included in, or added to, the medium to provide the desired pH. For example, hydrogen halides, preferably hydrogen chloride, sulfurous acid, sulfuric acid, metal salts which decompose (in the aqueous medium) to form such acids, alkali metal hydroxides, for example, sodium and potassium, alkaline earth metal hydroxides, ammonium hydroxide, metal salts which decompose (in the aqueous medium) to form such bases, their corresponding carbonates, preferably sodium carbonate, mixtures thereof and the like may be employed. It is preferred to use an hydroxide as the base, preferably sodium hydroxide. The quantity and composition of the aqueous medium may be selected in accordance with the requirements of any given ore to be treated and as may be found advantageous for any given mode applying the present process in practice. In carrying out the present process, one or more wetting agents and/or sulfur dispersion agents and/or metal catalysts can be included in, e.g., added to, the aqueous composition (in addition to the ortho-quinone containing components) to further enhance rates and/or yields. Examples of such agents include hydrocarbon sulfonates, lignosulfonates, alkyl substituted succinic anhydrides, alcohol ethoxylates and the like. Typical examples of metal oxidation catalysts are iron, copper, cobalt, vanadium, and manganese components which are soluble in catalytically effective amounts in an aqueous medium, preferably selected from iron complexes with ligands, copper complexes with ligands, vanadium components with ligands, manganese components with ligands, and mixtures thereof.

The amount of ortho-quinone containing components employed may vary widely provided that such amount is effective to function as described herein. Such ortho-quinone containing components are preferably present during said contacting in an amount less than about 5%, more preferably in the range of about 0.05% to about 3% by weight, and still more preferably from about 0.1% to about 2%, calculated as o-quinone containing material, based on the amount of ore present and/or liquid present during contacting such as a solution used in an agitated leach or during a vat or heap leach. One of the substantial advantages of the present process is that large amounts of ortho-quinone containing components are not required although adjustments can be made depending on the deleterious carbon concentration in the ore. Thus, in order to reduce costs still further while achieving benefits of the present invention, low concentrations of such materials are preferably selected.

The present contacting is preferably conducted in the presence of at least one additional active oxidant species other than the ortho-quinone containing component. The oxidant is present in an amount effective to do at least one of the following: maintain or form the ortho-quinone containing component, produce or regenerate at least a portion of the ortho-quinone containing component, and/or oxidize at least a portion of the carbonaceous material in the ore. The oxidant or oxidants may be present during the contacting step and/or during a separate step to form and/or regenerate the ortho-quinone containing component. Any suitable oxidant capable of performing one or more of the above-noted functions may be employed. The oxidant is preferably selected from the group consisting of molecular oxygen (e.g. in the form of air, dilute or enriched air, or other mixtures with nitrogen or carbon dioxide), single oxygen, ozone, inorganic oxidant components containing oxygen and at least one second metal and mixtures thereof. More preferably, the oxidant is selected from the group consisting of molecular oxygen, oxidant components containing oxygen and at least one second metal and mixtures thereof. Still more preferably, the oxidant is oxygen. The oxidant can involve a mixture of oxidants such as an oxidant component containing oxygen and at least one second metal, and molecular oxygen in an amount effective to maintain the ortho-quinone containing component in the desired oxidized state and/or to oxidize at least a portion of the carbonaceous material in the ore and/or in the case of a reducible metal oxidant, to reoxidize such oxidant by, for example, molecular oxygen. Care should be exercised to avoid large excesses of the oxidant to as to minimize reactions that could solubilize deleterious elements, i.e., arsenic, etc.

The reducible second metal oxidants useful in the present invention may be chosen from a wide variety of materials. The second metal or metals are preferably not the same as the metal or metals to be recovered from the ore or ores. Preferably, the second metal is a metal which forms reducible metal oxides which are reduced during the conduct of the process of this invention. Many of the transition metals have this property. Typical examples of metals which have this property include minerals and other compounds which are generally solids under the condition of the process, such as, manganese, tin, lead, bismuth, germanium, antimony, indium and certain of the rare earth metals and minerals, e.g., cerium, praseodyminium and terbium and mixtures of rare earth minerals which typically have varying ratios of lanthanum, cerium, etc. Such reducible second metal components are preferably capable of becoming at least partially reduced at the present contacting conditions to form a reduced second metal component.

Manganese is a more preferred second metal. In one embodiment, the reducible manganese component includes manganese in the 4+ oxidation state. One particularly useful reducible manganese component is manganese (manganic)dioxide and its pyrolusite, manganite, birnessite and manganese-bearing minerals from the spinel group. Silver, manganese-containing ores in which at least a portion of the silver is locked by the manganese-bearing minerals are particularly useful in combination with ores containing carbonaceous material, as described herein. In the above embodiment, it is preferred to have present molecular oxygen during processing. The latter system provides substantially soluble components for recovery of metal.

The present contacting results in at least a portion of the ortho-quinone containing component being chemically reduced to form a reduced di hydroxy benzene containing component. This reduced component can exit the contacting zone and be separated from the ore or ores, in particular the contacted ore or ores, i.e., partial to substantial separation. This component can be used on a once-through basis, or may be regenerated to an ortho-quinone containing component as set forth above, in situ or externally and recycled to the contacting zone. In the case of a once-through basis, it is preferred to minimize the amount of reduced component exiting with the ore or ores. Such regeneration can be done by oxidizing the reduced component or with molecular oxygen, in situ or external, at ambient and/or elevated temperatures to convert the reduced component to an ortho-quinone containing component.

The amount of oxidant employed in the present invention is chosen to facilitate the desired functioning of the present contacting step. Without limiting the invention to any specific theory or mechanism of operation, it may be postulated that when oxidant is employed such oxidant acts in conjunction with the ortho-quinone containing component to oxidize at least a portion of the carbonaceous material in the ore and "liberate" the metal to be recovered from the ore. Although the ortho-quinone containing component takes an active part in the oxidation and liberation functioning, when oxidant is employed, such ortho-quinone containing component preferably acts as a catalyst or promoter and may be, and preferably is, used more than once in the present contacting step, e.g., is recycled to the present contacting step or is employed to contact more than one increment of the ore or ores.

The amount of oxidant employed preferably acts to facilitate the desired oxidation of the reduced ortho-quinone containing component and optionally at least a portion of the carbonaceous material and liberation of metal to be recovered from the ore. The specific amount of oxidant employed varies depending on many factors, for example, the specific ore or ores being treated, the specific ortho-quinone containing component and oxidant being employed, and the specific degree of oxidation and metal liberation desired. If a reducible second metal oxidant is used, it preferably is used in an amount in the range of about 0.1% or less to about 10% or more to about 150% by weight of the metal sulfide or deleterious carbon content of carbonaceous ore. Preferably, the amount of oxidant employed in the present contacting step should be sufficient to provide the oxidation/metal liberation to the desired degree. Substantial excesses of additional oxidant should be avoided since such excesses may result in materials separation and handling problems, and may result in reduced recovery of the desired metal or metals.

Although one or more of the oxidants may be utilized in a separate oxidation or regeneration step, it is preferred that such oxidants, and in particular oxygen, be present and effective during the contacting step of the present invention.

The contacting of the present invention takes place at a temperature and pressure and for a time sufficient to obtain the desired results. A combination of temperature and pressure effective to maintain water (the aqueous medium)in the liquid state is preferred. In one embodiment, temperatures of about 20° to about 140° C. with temperatures in the range of about 20° C. to about 110° C. and in particular between about 23° C. to about 60° C. being especially useful. Contacting pressure may be in the range of about atmospheric to about 500 psia or more. Pressures in the range of about atmospheric to about 100 psia have been found to provide satisfactory results.

Contacting times vary widely depending, for example, on the mode in which the contacting is performed. Such contacting time may range from minutes to weeks or even months. For example, if the contacting occurs in a stirred tank with the ore or ores present in a slurry with the aqueous medium and the ortho-quinone containing component, the contacting time preferably is in the range of about 0.1 hours to about 60 hours, more preferably about 1 hour to about 24 hours. On the other hand, if the contacting takes place with the ore or ores placed in a heap with the aqueous medium and ortho-quinone containing component being made to flow through the heap, the contacting time is preferably in the range of about 1 day to about 6 months, more preferably about 7 days to about 60 days.

The present process may be conducted on a batch or continuous basis. The present contacting step may be conducted on a pad, with the ore or ores to be treated situated in a heap; or in a vat, tank or other suitable arrangement. The primary criterion for the contacting step is that the desired carbonaceous material oxidation and metal liberation take place. Preferably, the metal-containing carbonaceous ore and the ortho-quinone containing component are brought together to form an intimate admixture generally with the aqueous composition. The ore or ores are preferably subjected to particle size reduction, e.g., by crushing, grinding, milling and the like, prior to contacting to render the ore or ores more easily and/or effectively processed in the present contacting step. Air or other gaseous oxidant may be dispersed through, or otherwise contacted with, this admixture during the contacting step to achieve the desired result. Amounts of acid and/or base and/or can be added to the initial admixture and/or may be added during the contacting to provide the desired pH.

The pH of the aqueous liquid medium may be adjusted or maintained during the contacting step, for example, by adding one or more basic components to the aqueous liquid medium. Any suitable basic component or combination of such components may be included in, or added to, this medium to provide the desired basicity. For example, basic alkali metal and alkaline earth metal components, e.g., hydroxides, silicates, carbonates and bicarbonates, mixtures thereof and the like may be employed. Because of cost, availability and performance considerations, calcium hydroxide, sodium hydroxide, and mixtures thereof, particularly sodium hydroxide, are preferred.

The solid ore/material remaining after the contacting step may be subjected to any suitable metal recovery processing step or steps for the recovery of the metal, e.g., silver, gold, the platinum group metals and the like. For example, this solid ore/material may be neutralized with any suitable acidic or basic material, such as sulfuric acid, carbonates, bicarbonates white lime or milk of lime, and then subjected to a conventional sodium cyanide extraction, followed by activated carbon treatment and zinc dust precipitation. Alternately, the solid ore/material after contacting can be neutralized and subjected to an ammonium thiosulfate or an acid thiourea extraction followed by zinc dust precipitation. Still further, the solid ore/material after contacting can be subjected to a brine extraction followed by ion exchange to recover the desired metal or metals. The conditions at which these various recovery processing steps take place are conventional and well known in the art, and therefore are not described in detail here. However, it is important to note that conducting the metal recovery processing on the ore/material after the contacting of the present invention provides improved metal recovery performance relative to conducting the same metal recovery processing without this contacting.

In a further embodiment of this invention the contacting step and metal, e.g., silver, gold, platinum group metals and the like, recovery step can be practiced at the same time in the same processing system, i.e., agitated, vat or heap. The pH of both systems should be similar to avoid any deleterious side reactions e.g., destruction of the cyanide solution or thiourea. For example, the ortho-quinone containing components which are effective at higher pH's, preferably the ranges set forth above, more preferably, e.g., about 9 to about 13, can be used in the presence of cyanide leaching solution to provide both liberation and recovery of metals in the same system.

One processing arrangement which provides outstanding results involves the agglomeration of, for example, the metal-containing carbonaceous ore and a solid ortho-quinone containing component. The ore, ores and/or materials are preferably subjected to crushing, grinding, or the like processing to reduce particle size to that desired optimum metallurgical liberation, generally a maximum particle diameter of about ½ inch or less. The solid particles are mixed with sufficient aqueous. This intimate admixture is formed into agglomerates by conventional processing, such as agglomeration, extruding, pilling, tableting and the like.

The agglomerates are placed on a pad, to form a heap which is built up by addition of agglomerates, preferably over a period of time in the range of about 15 days to about 60 days. During the time the heap is being built up, and preferably for a period of time ranging up to about 3 months, more preferably about 2 months to about 3 months after the last agglomerates are added to the heap, an aqueous composition containing the ortho-quinone containing component and preferably adjusted for pH, and/or the presence of air, is made to flow through the heap, e.g., from the top to the bottom of the heap. After contacting the heap, the aqueous composition is collected and processed for disposal; or processed for ortho-quinone containing component recovery, regeneration and/or recycling to the heap. This contacting provides another important benefit in that at least a portion of the "cyanacides," such as copper, which may be present in the ore and/or metal sulfide-containing material can be removed and/or deactivated. Such "cyanacides" cause substantial increases in cyanide consumption if present in cyanide extraction processing. Therefore, removing and/or deactivating cyanacides in the present contacting step provides for more effective metals recovery by cyanide extraction.

Following contacting with the ortho-quinone containing component aqueous medium, a dilute aqueous cyanide, preferably sodium cyanide, solution is made to contact the heap. Typically, this cyanide contacting is performed in the presence of air. Preferably, the cyanide solution is percolated through the heap. The cyanide solution, after being contacted with the heap, contains the metal or metals to be recovered. This solution is collected and sent to conventional further processing for recovery of the metal or metals. As set forth above, both ortho-quinone containing component and cyanide contacting can be conducted concurrently.

The heap is preferably maintained at ambient conditions e.g., of temperature and pressure. Also, a heap may be built up and worked (contacted) with the aqueous composition and the cyanide solution for as long as the economics of the particular application involved remain favorable.

When an agitated leach in vessels is used for the process, contact times may vary depending, for example, on the specific ore or ores being contacted, the other components present during the contacting and the degree of metal recovery desired. Contact times in the range of about 5 minutes or less to about 48 hours or more may be used. Preferably, the contact time is in the range of about 4 hours to about 36 hours, more preferably from about 8 hours to about 24 hours. During this time, agitation can be advantageously employed to enhance contacting. Known mechanical mixers can be employed. As set forth above, the ortho-quinone contacting component and cyanide contacting can be conducted concurrently.

As set forth above, cyanidation can be used to recover precious metal values, particularly gold and silver, from ores containing such precious metal values. In the cyanidation process, alkaline cyanide solution are mixed with liberatable and/or amenable gold and silver ores to dissolve the metal values from the ore. In the dissolution reaction, the precious metal, for example gold (solid), reacts with the cyanide ion in the presence of oxygen and water to form a gold cyanide complex. One of the problems with aeration using air dissolved in the aqueous solution at ambient or elevated pressures in for example agitated or heat bleaches is the non-uniform distribution of the oxygen and, in general, very slow reaction kinetics. Various approaches to improve overall efficiencies for the required oxidant has been the use of pure oxygen and the addition of hydrogen peroxide for the oxidant used in forming the gold cyanide complex. In a further embodiment of this invention, it has been found that the ortho-quinone containing component can function as an oxidant in cyanidation to improve and enhance the recovery of precious metals, particularly gold and silver. In carrying out the cyanidation process, the ortho-quinone containing component interacts with the gold and cyanide solution to form a gold cyanide complex. The precious metals are then recovered by conventional precious metal recovery processes as set forth above. The ortho-quinone component interaction with the gold and cyanide solution can be direct and/or indirect oxidation, i.e., promoting oxidation, optionally in the presence of oxygen. The combination of ortho-quinone containing component and aqueous cyanide solution provides for improvements in, for example, the overall recovery of precious metal and/or the rate at which the gold cyanide complex is formed in comparison to conventional processing such as aeration. The cyanidation process of this invention is applicable to a wide range of precious metal containing ores including carbonaceous ores, sulfide containing ores, oxide ores, as well as other ores, particularly ores which are amenable to cyanidation for recovery of precious metals.

The following non-limiting examples illustrate certain of the advantages of the present invention.

EXAMPLE I

A quantity of a high carbonaceous ore was selected for bench scale testing. The experiment employed 1000 grams of ore (75% minus 65 mesh) which produced 33 weight percent solids of an aqueous fraction. The system was agitated with air sparging and suspended in a water bath maintained at 50° C. The conditions and results of this experiment is summarized as follows:

Conditions: The aqueous fraction included 1.0% by weight of a sodium lignosulphonate which had been produced by an acid bisulfite pulping process. The sodium lignosulphonate had been processed to reduce the reducing sugar content to 0.1 wt/percent. The lignosulphonate further had the following chemical properties: 16.1% sodium, 0.5% calcium, 1.5% sulphate sulfur, 2.5% wt/pct non-sulphonate sulfur, 8.9% sulphonate sulfur, 11.4% total sulfur, 4.5% methoxy, and contained catechol functionality. Prior to the addition of the sodium lignosulphonate component, a 45 wt/% aqueous solution of the sodium lignosulphonate was sparged with air at a temperature of 35° C. for a period of time of 30 minutes at a pH of 12 adjusted with sodium hydroxide. The air sparging oxidized residual catechol functionality to the orth-quinone functionality. The aqueous fraction was adjusted to a pH of 11.5 to 12 and the process was continued for a period of 24 hours in a stirred reactor with air sparging. The ore was analyzed as containing large quantities of carbonaceous material and had a gold content of 0.051 ounces per ton. The gold recovery by conventional cyanidation after 72 hours based on Head vs Tail Analysis was 57.8%.

Results: The ore after processing was subjected to cyanidation in the same manner as the untreated ore and a gold recovery of 77.8% was achieved.

These results show the outstanding effectiveness of an ortho-quinone containing component of this invention for the recovery of gold from a highly carbonaceous ore. The example also shows the cyclic activity of the ortho-quinone containing component with oxygen to provide enhanced gold recovery.

While the present invention has been described with respect to various specific examples and embodiments, it is to be understood that the present invention is not limited thereto and that it can be variously practiced within the scope of the following claims.

What is claimed is:

1. A process for recovering at least one first metal selected from the group consisting of gold, silver, the platinum group metals and mixtures thereof from an ore containing carbonaceous material comprising contacting said ore with a least one added plant derived aromatic component selected from the group consisting of lignin, and tannin and having ortho-quinone functionality wherein the ortho-quinone functionality is present in the component in the range of from at least about 1 weight percent to about 40 weight percent of the total weight of the plant derived aromatic component and mixtures thereof said plant derived aromatic component being present in an aqueous soluble amount to at least promote the oxidation of at least a portion of said carbonaceous material and at least partially liberate the metal to be recovered from said ore and an additional oxidant being present to provide at least one of the following: (1) form and cycle to an oxidized state said plant derived aromatic component between ortho-quinone and catechol oxidation states and (2) cycle to an oxidized state said plant derived aromatic component between ortho-quinone and catechol oxidation states and recovering said first metal from said ore.

2. The process of claim 1 wherein the plant derived aromatic component is lignin.

3. The process of claim 1 wherein the plant derived aromatic component has water soluablizing groups selected from the group consisting of sulfonate salts, phenolate salts, carboxylate salts and mixtures thereof.

4. The process of claim 3 wherein the plant derived aromatic component is selected from the group consisting of a sodium lignosulfonate, a sodium lignin and mixtures thereof.

5. The process of claim 4 wherein the plant derived aromatic component is a sodium lignosulfonate.

6. The process of claim 2 wherein the ortho-quinone functionality is present in the component in the range of from at least about 2 weight percent to about 30 weight percent of the total weight of the plant derived aromatic component.

7. The process of claim 4 wherein the ortho-quinone functionality is present in the component in the range of from at least about 2 weight percent to about 30 weight percent of the total weight of the plant derived aromatic component.

8. The process of claim 1 wherein the oxidant is oxygen and the contacting is in the presence of an aqueous medium at a pH in the range of from about 9 to about 13.

9. The process of claim 1 wherein the oxidant is oxygen and the contacting is in the presence of an aqueous medium at a pH in the range of from about 9 to about 13.

10. The process of claim 3 wherein the oxidant is oxygen and the contacting is in the presence of an aqueous medium at a pH in the range of from about 9 to about 13.

11. A process for recovering at least one first metal selected from the group consisting of gold, silver, the platinum group metals and mixtures thereof from an ore comprising contacting said ore with at least one added plant derived aromatic component selected from the group consisting of lignin, and tannin and having ortho-quinone functionality wherein the ortho-quinone functionality is present in the component in the range of from at least about 1 weight percent to about 40 weight percent of the total weight of the plant derived aromatic component and cyanide in the presence of an aqueous medium at an alkaline pH at conditions effective to form a gold cyanide complex, said plant derived aromatic component being present in an aqueous soluble amount effective to at least promote the formation of the first metal cyanide complex and an additional oxidant being present to provide at least one of the following: (1) form and cycle said plant derived aromatic component between ortho-quinone and catechol oxidations states and (2) cycle said plant derived aromatic component between ortho-quinone and catechol oxidation states and recovering said first metal from said ore.

12. The process of claim 11 wherein the plant derived aromatic component is selected from the group consisting of lignin, tannin and mixtures thereof.

13. The process of claim 11 wherein the plant derived aromatic component is selected from the group consisting of a sodium lignosulfonate, a sodium lignin and mixtures thereof.

14. The process of claim 11 wherein the ortho-quinone functionality is present in the component in the range of from about 1 weight percent to about 30 weight percent.

15. The process of claim 11 wherein the oxidant is oxygen and the contacting is in the presence of an aqueous medium at a pH in the range of from about 9 to about 13.

16. The process of claim 5 wherein the ortho-quinone functionality is present in the component in the range of from at least about 2 weight percent to about 30 weight percent of the total weight of the plant derived aromatic component.

17. The process of claim 5 wherein the oxidant is oxygen and the contacting is in the presence of an aqueous medium at a pH in the range of from about 9 to about 13.

18. The process of claim 7 wherein the oxidant is oxygen and the contacting is in the presence of an aqueous medium at a pH in the range of from about 9 to about 13.

19. The process of claim 13 wherein the ortho-quinone functionality is present in the component in the range of from about 1 weight percent to about 30 weight percent.

* * * * *